US011954557B2

(12) United States Patent
McPherson

(10) Patent No.: US 11,954,557 B2
(45) Date of Patent: Apr. 9, 2024

(54) USAGE LOG FOR A BARCODE-READING DEVICE

(71) Applicant: The Code Corporation, Murray, UT (US)

(72) Inventor: Robert Eugene McPherson, Heber City, UT (US)

(73) Assignee: THE CODE CORPORATION, Murray, UT (US)

( * ) Notice: Subject to any disclaimer, the term of this patent is extended or adjusted under 35 U.S.C. 154(b) by 55 days.

(21) Appl. No.: 17/810,779

(22) Filed: Jul. 5, 2022

(65) Prior Publication Data

US 2024/0013016 A1  Jan. 11, 2024

(51) Int. Cl.
*G06K 7/14* (2006.01)
(52) U.S. Cl.
CPC ................... *G06K 7/1413* (2013.01)
(58) Field of Classification Search
CPC ............. G06K 7/1413; G06K 7/10722; G06K 7/10881; G06K 19/00; G06K 7/14
USPC .............. 235/380, 487, 375, 462.01, 462.11, 235/462.24
See application file for complete search history.

(56) References Cited

U.S. PATENT DOCUMENTS

| 6,405,924 B1* | 6/2002 | Shah ...................... G06K 17/00 235/462.1 |
| 2004/0127277 A1* | 7/2004 | Walker .................... H04L 63/08 463/16 |
| 2014/0151446 A1 | 6/2014 | Bovell |
| 2015/0032838 A1* | 1/2015 | Demsey ............. G06F 16/9574 709/213 |
| 2015/0039409 A1* | 2/2015 | Marsico ............ G06Q 30/0217 705/14.1 |
| 2017/0186110 A1* | 6/2017 | Carpenter ............. G06Q 50/12 |
| 2022/0157418 A1 | 5/2022 | Ashmore et al. |

* cited by examiner

*Primary Examiner* — Edwyn Labaze
(74) *Attorney, Agent, or Firm* — Thomas M. Hardman

(57) ABSTRACT

A barcode-reading device can be configured to record certain information about events related to the barcode-reading device in a usage log. The barcode-reading device can be configured so that it records certain information in the usage log whenever the barcode-reading device scans a barcode (e.g., a timestamp, an indication of whether the barcode is successfully decoded, a symbology of the barcode, decoded data). The barcode-reading device can also be configured so that it records information about events that are not specifically associated with a barcode scan (e.g., when the barcode-reading device is powered on, when the barcode-reading device experiences a failure). The information contained in the usage log can be processed to determine statistics relevant to the barcode-reading device. The device statistics can be used for various purposes, such as improving the performance of the barcode-reading device, improving the user's experience with the barcode-reading device, and so forth.

19 Claims, 10 Drawing Sheets

| TIMESTAMP FIELD | EVENT CODE FIELD | SUCCESS INDICATOR FIELD | DECODED DATA FIELD |
|---|---|---|---|
| 05/19/2022 09:57:08 | 1 | | |
| 05/19/2022 10:32:43 | 3 | 0 | 1139 |
| 05/19/2022 10:32:58 | 3 | 0 | 3290 |
| 05/19/2022 10:33:11 | 3 | 1 | |
| 05/19/2022 10:33:27 | 3 | 0 | 2176 |
| 05/19/2022 11:05:15 | 4 | | |
| 05/19/2022 11:07:36 | 1 | | |
| 05/19/2022 12:07:36 | 2 | | |
| 05/19/2022 13:27:04 | 1 | | |
| 05/19/2022 13:28:10 | 3 | 0 | 7382 |
| 05/19/2022 13:28:17 | 3 | 0 | 9284 |
| 05/19/2022 13:28:43 | 3 | 0 | 2048 |
| 05/19/2022 14:35:25 | 4 | | |
| 05/19/2022 14:37:03 | 1 | | |

FIG. 2

USAGE LOG FOR A BARCODE-READING DEVICE

CROSS-REFERENCE TO RELATED APPLICATIONS

N/A

BACKGROUND

The present disclosure is generally related to barcodes and barcode-reading devices. The term "barcode" refers to an optical machine-readable representation of information. The term "barcode-reading device" refers to any device that is capable of identifying or extracting information from barcodes.

An image-based barcode-reading device includes a camera for capturing an image of a barcode to be read. The camera includes a focusing lens that focuses light reflected from a target area onto a photosensor array. Once an image of a barcode has been captured by the camera, a decoder processes the image and extracts the information contained in the barcode. An image-based barcode-reading device can be a standalone device (commonly referred to as a barcode reader or a barcode scanner), or an image-based barcode-reading device can be a mobile computing device (e.g., a smartphone or tablet computer) that includes a camera and software for reading barcodes.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The systems and methods disclosed herein are generally related to a usage log that is maintained by a barcode-reading device. A barcode-reading device can be configured to record certain information about events related to the barcode-reading device in the usage log. In some embodiments, a barcode-reading device can be configured so that it records certain information in the usage log whenever the barcode-reading device scans a barcode. Such information can include a timestamp, an indication of whether the barcode is successfully decoded, a symbology of the barcode, decoded data, etc. A barcode-reading device can also be configured so that it records information about events that are not specifically associated with a barcode scan (e.g., when the barcode-reading device is powered on, when the barcode-reading device experiences a failure). Additional examples of events that can be recorded in the usage log will be described below.

The information contained in the usage log can be processed to determine statistics relevant to the barcode-reading device. Such statistics may be referred to herein as device statistics. There are many different types of device statistics that can be determined based at least in part on the information contained in the usage log. A few examples of device statistics include the number of barcode scans made during a particular time period, the average number of barcode scans made per time period, the number of unsuccessful (or successful) barcode scans made during a particular time period, etc. Additional examples of device statistics will be described below.

The barcode-reading device can be communicatively coupled to a host computing device. In some embodiments, the host computing device can be configured to retrieve the usage log from the barcode-reading device and send the usage log to the remote server. The remote server can then determine device statistics based at least in part on the usage log. In other embodiments, the host computing device can retrieve device statistics from the barcode-reading device and send the device statistics to the remote server. In other embodiments, the host computing device can retrieve both the usage log and device statistics from the barcode-reading device and send this information to the remote server. The remote server can then use the device statistics that it receives from the barcode-reading device and also determine additional device statistics based at least in part on the usage log that it receives from the barcode-reading device.

The remote server can analyze the device statistics and generate data analysis results. There are many different kinds of device statistics and data analysis results that can be generated in accordance with the present disclosure. In some embodiments, the device statistics and data analysis results can be related to reliability and/or maintenance of the barcode-reading devices. In other embodiments, the device statistics and data analysis results can be related to how much the barcode-reading devices are actually being used. The device statistics and data analysis results can be used for various purposes, such as improving the performance of the barcode-reading device, improving the user's experience with the barcode-reading device, and so forth.

In some embodiments, the host computing device can be configured so that once the usage log and/or device statistics have been collected from the barcode-reading device, that information is then erased from the barcode-reading device. Thus, in such embodiments, the usage log and/or the device statistics are not stored on a barcode-reading device any longer than necessary. This can enhance security of the usage log and/or device statistics.

In some embodiments, additional security can be provided by storing the usage log and/or device statistics in a hidden portion of the barcode-reading device's memory. The hidden portion can be a segment of the barcode-reading device's memory that cannot be accessed by a user interface of the barcode-reading device.

In some embodiments, a plurality of barcode-reading devices can each be configured to maintain a usage log as described above. In such embodiments, the usage logs maintained by the plurality of barcode-reading devices can be used to generate device statistics about the plurality of barcode-reading devices. The device statistics can be analyzed to determine information about the barcode-reading devices. The data analysis results that are produced based at least in part on the device statistics can be provided to one or more entities who could be interested in the information (such as an enterprise who owns and/or uses the barcode-reading devices, a manufacturer of the barcode-reading devices, or the like).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 2 illustrates an example of a usage log that can be maintained by a barcode-reading device in accordance with the present disclosure.

DETAILED DESCRIPTION

Figure 1A:
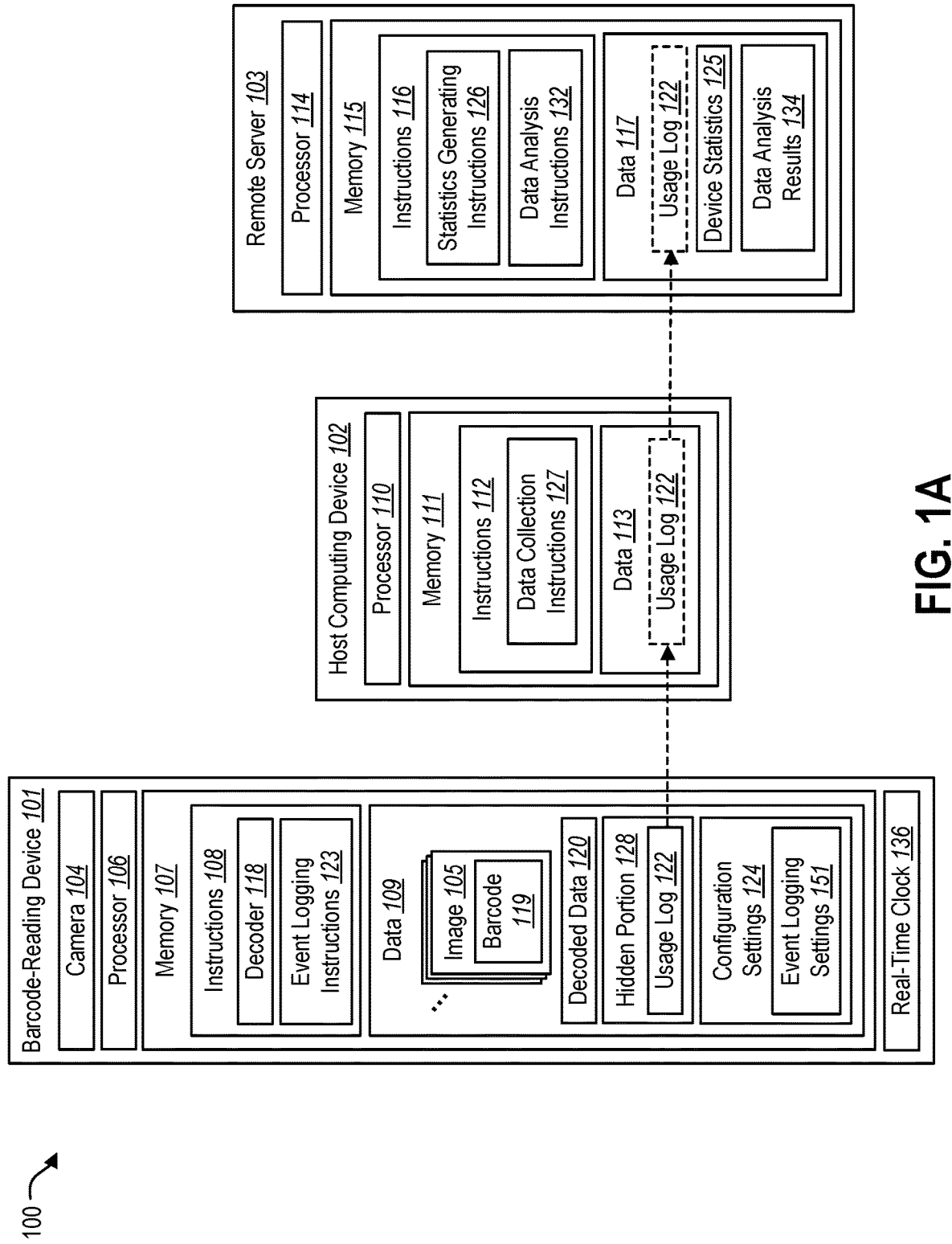
FIGS. 1A and 1B illustrate an example of a barcode-reading system in which the techniques disclosed herein can be utilized.
Figure 1B:
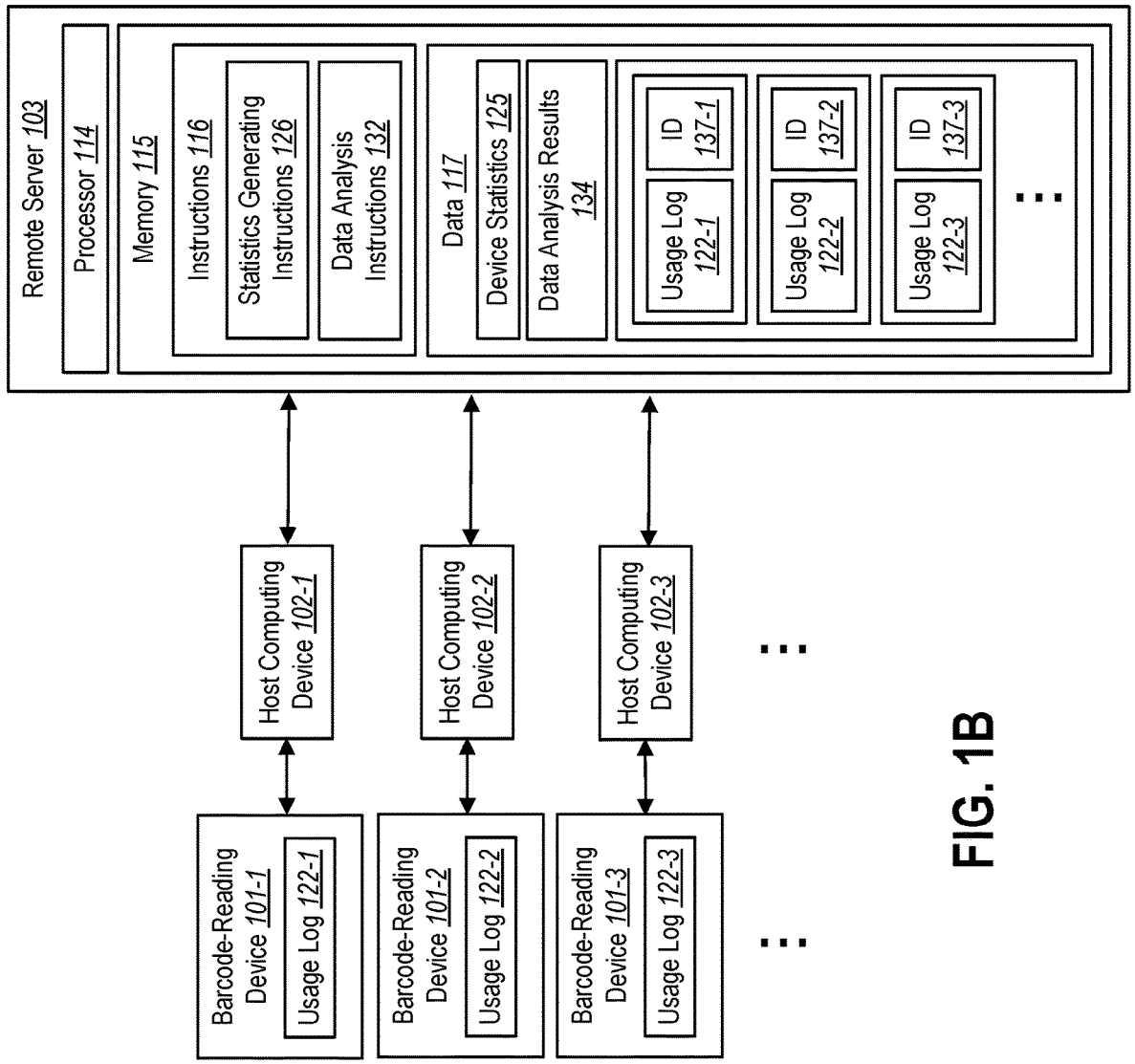

FIGS. 1A and 1B illustrate an example of a barcode-reading system 100 in which the techniques disclosed herein can be utilized. Reference is initially made to FIG. 1A, which shows a barcode-reading device 101 communicatively coupled to a host computing device 102. The host computing device 102 is also communicatively coupled to a remote server 103.

As shown in FIG. 1B, the system 100 can include a plurality of barcode-reading devices 101-1, 101-2, 101-3 communicatively coupled to a plurality of host computing devices 102-1, 102-2, 102-3, respectively. The host computing devices 102-1, 102-2, 102-3 can each be communicatively coupled to the remote server 103. Each of the barcode-reading devices 101-1, 101-2, 101-3 shown in FIG. 1B can be configured similarly to the barcode-reading device 101 shown in FIG. 1A. In other words, each of the barcode-reading devices 101-1, 101-2, 101-3 shown in FIG. 1B can include the components of the barcode-reading device 101 shown in FIG. 1A. Similarly, each of the host computing devices 102-1, 102-2, 102-3 shown in FIG. 1B can be configured similarly to the host computing device 102 shown in FIG. 1A. In other words, each of the host computing devices 102-1, 102-2, 102-3 shown in FIG. 1B can include the components of the host computing device 102 shown in FIG. 1A.

For simplicity, only a few barcode-reading devices 101-1, 101-2, 101-3 and a few host computing devices 102-1, 102-2, 102-3 are shown in FIG. 1B. However, this should not be interpreted as limiting the scope of the present disclosure. Those skilled in the art will understand that the techniques disclosed herein can be utilized in a barcode-reading system that includes a large number of barcode-reading devices 101 and host computing devices 102.

In addition, although just one remote server 103 is shown in the depicted barcode-reading system 100, the functionality that is described herein in connection with the remote server 103 can be implemented using a plurality of different servers working together.

Referring once again to FIG. 1A, the barcode-reading device 101 includes a camera 104 that is configured to capture images 105. The camera 104 can be a digital camera, and the images 105 can be digital images.

The camera 104 can include an optical assembly including one or more lenses. The camera 104 can also include an image sensor (or imager). The image sensor can be a solid-state device that is configured to detect and convey information used to make an image. The image sensor can include a relatively large number of light-sensitive pixels that are arranged in horizontal rows and vertical columns. The image sensor can be a charge-coupled display (CCD) image sensor, a complementary metal-oxide-semiconductor (CMOS) image sensor, or another type of image sensor.

The lens(es) within the optical assembly can be configured to receive light reflected from objects within the field of view of the camera 104 and focus this reflected light onto the image sensor. The camera 104 can also include read-out circuitry that is configured to electronically read the pixels within the image sensor to provide an image (i.e., a two-dimensional array of image data).

At least some of the functionality described herein in relation to the barcode-reading device 101, host computing device 102, and remote server 103 can be implemented via execution of instructions stored in memory by one or more processors. The barcode-reading device 101 is shown with a processor 106 and memory 107 communicatively coupled to the processor 106. Instructions 108 and data 109 are stored in the memory 107. Similarly, the host computing device 102 is shown with a processor 110 and memory 111 communicatively coupled to the processor 110. Instructions 112 and data 113 are stored in the memory 111. The remote server 103 is also shown with a processor 114 and memory 115 communicatively coupled to the processor 114. Instructions 116 and data 117 are stored in the memory 115.

The instructions 108 in the memory 107 of the barcode-reading device 101 include a decoder 118. The decoder 118 processes the images 105 that are captured by the camera 104 and attempts to decode any barcodes 119 in the images 105. When the decoder 118 is able to successfully decode a barcode 119 in an image 105, the decoder 118 generates decoded data 120. The decoded data 120 can be used in a variety of different ways. For example, the decoded data 120 can be provided to an application running on the host computing device 102. The application can be configured so that it expects to receive the decoded data 120 from the barcode-reading device 101.

The barcode-reading device 101 also includes a usage log 122. The usage log 122 can store certain information about events related to the barcode-reading device 101. The instructions 108 in the memory 107 of the barcode-reading device 101 can include event logging instructions 123. The event logging instructions 123 can be executable by the processor 106 of the barcode-reading device 101 to record information about events related to the barcode-reading device 101 in the usage log 122.

The memory 107 of the barcode-reading device 101 can include non-volatile memory. The usage log 122 can be stored in the non-volatile memory. The non-volatile memory can include a file system. The usage log 122 can be stored as one or more files within this file system.

There are many different kinds of events for which information can be recorded in the usage log 122. In some embodiments, the barcode-reading device 101 can be configured so that it records certain information in the usage log 122 whenever the barcode-reading device 101 is used to scan a barcode. There are many different kinds of information that can be recorded in the usage log 122 in connection with a particular barcode scan. In some embodiments, the information that is recorded in the usage log 122 in connection with a particular barcode scan can include some or all of the following: a timestamp, an indication of whether the barcode 119 is successfully decoded, the decoded data 120 that is obtained if the barcode 119 is successfully decoded, the symbology of the barcode 119, an identifier of the user (or operator) of the barcode-reading device 101 who performed the barcode scan, and so forth.

In some embodiments, copies of images 105 that are captured and processed by the barcode-reading device 101 in connection with unsuccessful barcode scans can be saved in the usage log 122. Such images 105 can be analyzed further for diagnostic purposes. In some embodiments, copies of images 105 that are captured and processed by the barcode-reading device 101 in connection with successful barcode scans can also be saved in the usage log 122. In some embodiments, instead of storing copies of images 105 in the usage log 122, the usage log 122 can instead include links to locations in memory 107 where the images 105 are stored.

The barcode-reading device 101 can also be configured so that it records information in the usage log 122 about events that are not specifically associated with a barcode scan. In some embodiments, the barcode-reading device 101 can be configured so that it records information about some or all of the following: when the barcode-reading device 101 is powered on, when the barcode-reading device 101 is powered off, when configuration settings 124 associated with the barcode-reading device 101 are changed, and when the barcode-reading device 101 experiences a failure.

As will be described in greater detail below, the information contained in the usage log 122 can include timestamps. In some embodiments, to enable the creation of timestamps, the barcode-reading device 101 can include a real-time clock 136. The real-time clock 136 includes electronic circuitry that is configured to measure the passage of time. In some embodiments, the event logging instructions 123 can be configured to request information from the real-time clock 136 when an event is being recorded in the usage log 122. The real-time clock 136 can return the current time to the event logging instructions 123. The current time can then be added as a timestamp to the usage log 122.

In an alternative embodiment, a barcode-reading device that does not have a real-time clock can still be configured to determine the current time for purposes of adding timestamps to the usage log 122. For example, when a barcode-reading device is powered on, the barcode-reading device could be used to scan a barcode that configures the barcode-reading device with the current time or that enables the barcode-reading device to determine the current time.

The information contained in the usage log 122 can be processed to determine device statistics 125. The device statistics 125 are statistics that are relevant to the barcode-reading device 101.

There are many different types of device statistics 125 that can be determined based at least in part on the information contained in the usage log 122. Some examples of device statistics 125 include the number of barcode scans made during a particular time period (e.g., how many barcode scans were made on May 31, 2022 between 9:00 a.m. and 10:00 a.m.), the average number of barcode scans made per time period over a longer time interval (e.g., average number of barcode scans made per hour during the month of May 2022), the number of unsuccessful barcode scans made during a particular time period, the average number of unsuccessful barcode scans made per time period over a longer time interval, the number of successful barcode scans made during a particular time period, the average number of successful barcode scans made per time period over a longer time interval, the total number of barcode scans made since the barcode-reading device 101 was powered on, the number of unsuccessful barcode scans made since the barcode-reading device 101 was powered on, the number of successful barcode scans made since the barcode-reading device 101 was powered on, how many times the barcode-reading device 101 failed (e.g., shut down unexpectedly) during a particular time period, the mean time between failures (MTBF) for the barcode-reading device 101, the average amount of time between barcode scans during a particular time interval, the average amount of time between usage bursts (the term "usage burst" will be described in greater detail below) during a particular time interval, which barcode symbologies have been used, which barcode symbologies are most popular, and so forth.

The device statistics 125 can be used for various purposes, such as improving the performance of the barcode-reading device 101, improving the user's experience with the barcode-reading device 101, etc. As an example, the number of barcode scans during a particular time interval (e.g., number of barcode scans per hour, number of barcode scans per day) can indicate how heavily a barcode-reading device 101 is being used. Similarly, the average amount of time between barcode scans during a particular time interval can also indicate how heavily a barcode-reading device 101 is being used. The need for additional barcode-reading devices 101 and/or additional users (or operators) of barcode-reading devices 101 in a given location can be inferred based on these device statistics 125. For example, in a medical environment (e.g., a hospital), having the number of barcode scans during a particular time interval exceed a certain level could be an indication that, in a time-critical scenario, the proper medical treatment might not be able to be handled in a timely fashion.

As another example of how device statistics 125 can be used, the timestamps in the usage log 122 can be analyzed to identify large fluctuations or other unusual behavior that could potentially indicate a battery failure. As an example, the timestamps in the usage log 122 can be analyzed to identify successive records where the difference in the timestamps of the records exceeds a threshold value. As another example, in embodiments where new records are always added to the end of the usage log 122, the timestamps in the usage log 122 can be analyzed to identify a later record that has an earlier timestamp than an earlier record.

The host computing device 102 can be configured to provide the usage log 122 to the remote server 103. More specifically, the host computing device 102 can include data collection instructions 127 that are executable by the processor 110 of the host computing device 102 to retrieve the usage log 122 from the barcode-reading device 101 and send the usage log 122 to the remote server 103. The remote server 103 can then generate device statistics 125 based at least in part on the information contained in the usage log 122.

The host computing device 102 can be configured to periodically retrieve the usage log 122 from the barcode-reading device 101 and send the usage log 122 to the remote server 103. In some embodiments, the host computing device 102 can be configured to retrieve the usage log 122 from the barcode-reading device 101 and send the usage log 122 to the remote server 103 at regular time intervals (e.g., once per week, once per day, once per hour).

In some embodiments, the host computing device 102 can be configured to retrieve the usage log 122 from the barcode-reading device 101 and send the usage log 122 to the remote server 103 whenever the barcode-reading device 101 makes N barcode scans. In this context, the value of N can be any integer greater than or equal to one.

More specifically, the host computing device 102 can be configured to retrieve the usage log 122 from the barcode-reading device 101 and send the usage log 122 to the remote server 103 (i) after N barcode scans have been made, if the usage log 122 has not previously been sent to the remote server 103, or (ii) after N barcode scans have been made since the last time that the usage log 122 was sent to the remote server 103. For example, if the value of N equals 100, then the host computing device 102 can send the usage log 122 to the remote server 103 after 100 barcode scans have been made, after 200 barcode scans have been made, after 300 barcode scans have been made, and so forth. As another example, if the value of N equals one, then the host computing device 102 can send the usage log 122 to the remote server 103 after each barcode scan.

In the depicted embodiment, the remote server 103 can be configured to generate the device statistics 125. The instructions 116 in the memory 115 of the remote server 103 can include statistics generating instructions 126. The statistics generating instructions 126 can be executable by the processor 114 of the remote server 103 to determine the device statistics 125 based at least in part on the information contained in the usage log 122.

In an alternative embodiment, the barcode-reading device 101 can generate the device statistics 125. The host computing device 102 can then send the device statistics 125 to the remote server 103. This alternative embodiment will be described in greater detail below.

Under some circumstances, the usage log 122 stored on the barcode-reading device 101 can include sensitive information. In such embodiments, it may be desirable to provide certain security protections with respect to the usage log 122.

In some embodiments, the usage log 122 can be stored within a hidden portion 128 of the memory 107 of the barcode-reading device 101. The hidden portion 128 can be a portion (or section) of the memory 107 that has one or more restrictions associated with it and/or that is hidden from a user of the barcode-reading device 101. In some embodiments, the hidden portion 128 of the memory 107 can be a private, protected section of the memory 107 that is not viewable by a user of the barcode-reading device 101. In some embodiments, the barcode-reading device 101 can be configured so that a user interface of the barcode-reading device 101 is prevented from accessing the hidden portion 128 of the memory 107. In this context, the term "user interface" can refer to any components (including hardware and/or software components) of the barcode-reading device 101 that enable the user to control and/or interact with one or more features of the barcode-reading device 101.

If the usage log 122 includes sensitive information that should not be accessible to users of the barcode-reading device 101, having the usage log 122 stored in a hidden portion 128 of the memory 107 can be beneficial because this prevents the users of the barcode-reading device 101 from accessing this information. Having the usage log 122 stored in a hidden portion 128 can also be beneficial in the event that the barcode-reading device 101 becomes lost or stolen. Someone who finds or steals the barcode-reading device 101 could potentially try to mine the barcode-reading device 101 for data. However, having the usage log 122 stored in a hidden portion 128 can prevent any unauthorized access to the data contained in the usage log 122.

In some embodiments, the barcode-reading device 101 can be configured with a device lock that enables the barcode-reading device 101 to be locked such that anyone who wishes to use the barcode-reading device 101 must enter credentials (e.g., a password) before they can use the device. In some embodiments, the device lock can be a feature of the user interface of the barcode-reading device 101. Having a device lock in combination with storing the usage log 122 in a hidden portion 128 of the memory 107 provides strong protection against unauthorized access to the data contained in the usage log 122.

As another example of a security protection that can be provided with respect to the usage log 122, the host computing device 102 can be configured to erase the usage log 122 under some circumstances. For example, the data collection instructions 127 can be executable by the processor 110 of the host computing device 102 to erase the contents of the usage log 122 after the usage log 122 has been retrieved from the barcode-reading device 101 and sent to the remote server 103 for processing. Erasing the usage log 122 from the barcode-reading device 101 has the effect of reducing the potential exposure of sensitive information by reducing the amount of sensitive information that is stored on the barcode-reading device 101. When the usage log 122 has been erased, the event logging instructions 123 can be configured to create a new usage log 122 when an event occurs that should be recorded in the usage log 122.

The remote server 103 can be configured to analyze the device statistics 125 and determine information about the barcode-reading device 101. More specifically, the memory 115 of the remote server 103 can include data analysis instructions 132. The data analysis instructions 132 can be executable by the processor 114 of the remote server 103 to analyze the device statistics 125 and generate data analysis results 134. There are many different kinds of device statistics 125 and data analysis results 134 that can be generated in accordance with the present disclosure. Some examples will be described below.

The data 109 in the memory 107 of the barcode-reading device 101 can include configuration settings 124. The configuration settings 124 can include certain settings that control features related to the usage log 122. Such settings may be referred to herein as event logging settings 151. In some embodiments, the event logging settings 151 can specify what information is recorded in the usage log 122 and how often such information is recorded in the usage log 122.

In some embodiments, the event logging settings 151 can be included as part of the firmware of the barcode-reading device 101. In other embodiments, the memory 107 can be structured so that the event logging settings 151 are configurable during manufacturing of the barcode-reading device 101 but are not configurable by the end user of the barcode-reading device 101. In other embodiments, the memory 107 can be structured so that the event logging settings 151 are configurable by the end user of the barcode-reading device 101.

There are many ways that the event logging settings 151 can be communicated to the barcode-reading device 101. In some embodiments, the event logging settings 151 can be communicated to the barcode-reading device 101 through one or more configuration barcodes. More specifically, one or more configuration barcodes can be created that include the event logging settings 151 for the barcode-reading device 101. The barcode-reading device 101 can then be used to scan the configuration barcode(s). Scanning and decoding the configuration barcode(s) can cause the barcode-reading device 101 to be configured with the event logging settings 151.

In some embodiments, the event logging settings 151 can be communicated to the barcode-reading device 101 through near-field communication (NFC). In this context, the term "near-field communication" (or "NFC") refers to communication protocols that enable communication between two electronic devices over relatively short distances. In some embodiments, the barcode-reading device 101 can include an NFC reader. One or more files can be created that include the event logging settings 151. Another computing device that includes an NFC transmitter can be placed in close proximity to the barcode-reading device 101, and the file(s) containing the event logging settings 151 can be communicated to the barcode-reading device 101 via one or more NFC communication protocols.

In some embodiments, communication between the barcode-reading device 101 and the host computing device 102 and/or between the host computing device 102 and the remote server 103 can occur via a wireless connection. In such embodiments, the barcode-reading device 101, the host computing device 102, and/or the remote server 103 can include wireless transceivers. Wireless communication can occur in accordance with any suitable wireless communication protocol, such as Bluetooth®, an Institute of Electrical and Electronics Engineers (IEEE) 802.11 wireless communication protocol, a cellular network protocol, or the like.

In some embodiments, communication between the barcode-reading device 101 and the host computing device 102 and/or between the host computing device 102 and the remote server 103 can occur via a wired connection. For example, the barcode-reading device 101, the host computing device 102, and/or the remote server 103 can include physical communication ports, and an electrical cable can be used to connect the barcode-reading device 101 to the host computing device 102 and/or to connect the host computing device 102 to the remote server 103. Some examples of physical communication ports that can be used include a Universal Serial Bus (USB) communication port, an Ethernet communication port, an IEEE 1394 communication port (also known as FireWire®), a serial port, a parallel port, and so forth.

In some embodiments, communication between the barcode-reading device 101 and the host computing device 102 and/or between the host computing device 102 and the remote server 103 can occur via one or more computer networks. The computer network(s) that facilitate communication among the barcode-reading device 101, the host computing device 102, and the remote server 103 can include one or more personal area networks (PANs), one or more local area networks (LANs), one or more metropolitan area networks (MANs), one or more wide area networks (WANs), and so forth. In some embodiments, communication between the barcode-reading device 101 and the host computing device 102 and/or between the host computing device 102 and the remote server 103 can occur via the Internet.

In some embodiments, the barcode-reading device 101 and the host computing device 102 can be located at the same physical location (e.g., within the same room). In other embodiments, the barcode-reading device 101 and the host computing device 102 can be located in different physical locations (e.g., different rooms within the same building).

In some embodiments, the remote server 103 can be in a different physical location than the barcode-reading device 101 and the host computing device 102. However, in other embodiments, the barcode-reading device 101, the host computing device 102, and the remote server 103 can all be in the same physical location (e.g., within the same building).

The remote server 103 can receive usage logs 122 from a plurality of barcode-reading devices 101. For example, FIG. 1B shows barcode-reading device 101-1 with a usage log 122-1, barcode-reading device 101-2 with a usage log 122-2, and barcode-reading device 101-3 with a usage log 122-3.

The host computing devices 102-1, 102-2, 102-3 can be configured to retrieve the usage logs 122-1, 122-2, 122-3 from the barcode-reading devices 101-1, 101-2, 101-3, respectively, and send the usage logs 122-1, 122-2, 122-3 to the remote server 103. The device statistics 125 and the data analysis results 134 generated by the remote server 103 can be based at least in part on all of the usage logs 122-1, 122-2, 122-3 that are received by the remote server 103.

At the remote server 103, each usage log 122 can be associated with information that identifies the barcode-reading device 101 that generated the usage log 122. In the depicted example, usage log 122-1 can be associated with an identifier 137-1 corresponding to barcode-reading device 101-1, usage log 122-2 can be associated with an identifier 137-2 corresponding to barcode-reading device 101-2, and usage log 122-3 can be associated with an identifier 137-3 corresponding to barcode-reading device 101-3. In some embodiments, the identifiers 137-1, 137-2, 137-3 can be sent to the remote server 103 along with the usage logs 122-1, 122-2, 122-3. For example, the host computing device 102-1 can obtain the identifier 137-1 from the barcode-reading device 101-1 (or, alternatively, generate the identifier 137-1 on its own) and send the identifier 137-1 to the remote server 103 with the usage log 122-1. The host computing devices 102-2, 102-3 can be configured to operate similarly with respect to the identifiers 137-2, 137-3, respectively.

As noted above, there are many different kinds of device statistics 125 and data analysis results 134 that can be generated in accordance with the present disclosure. In some embodiments, the device statistics 125 and data analysis results 134 can be related to reliability and/or maintenance of the barcode-reading devices 101. Device statistics 125 and data analysis results 134 that are related to reliability and/or maintenance of the barcode-reading devices 101 can be useful to a manufacturer of the barcode-reading devices 101 by giving the manufacturer a better idea of how the barcode-reading devices 101 are actually performing. For example, such device statistics 125 and data analysis results 134 can enable a manufacturer of the barcode-reading devices 101 to determine the actual duty cycle of the barcode-reading devices 101, to determine what can be done to make the barcode-reading devices 101 more reliable, etc.

Device statistics 125 and data analysis results 134 that are related to reliability and/or maintenance of the barcode-reading devices 101 can also be useful to an enterprise that owns and/or uses the barcode-reading devices 101. Consider an example in which the device statistics 125 include the mean time between failure (MTBF) for the barcode-reading devices 101 that are in use by the enterprise, and the data analysis results 134 indicate which barcode-reading devices 101 have an MTBF below a pre-defined threshold. This threshold can be defined such that any barcode-reading devices 101 with an MTBF below the threshold should be replaced. Thus, by looking at the data analysis results 134, the enterprise can quickly and easily see which of its barcode-reading devices 101 should be replaced.

In some embodiments, the device statistics 125 and data analysis results 134 can be related to how much the barcode-reading devices 101 are actually being used. For example, the device statistics 125 could include metrics such as the average number of barcode scans made per time period (e.g., average number of barcode scans made per hour). If this metric exceeds a pre-defined threshold for a particular barcode-reading device 101, this could be interpreted as an indication that the barcode-reading device 101 is being overused and that one or more additional barcode-reading devices 101 should be purchased. This information could be useful to an enterprise that owns and/or uses the barcode-reading devices 101. This information could also be useful to a manufacturer of barcode-reading devices 101 who wants to sell additional barcode-reading devices 101 to the enterprise.

For example, consider a scenario in which the barcode-reading devices 101-1, 101-2, 101-3 shown in FIG. 1B are being used in a medical facility such as a hospital. Suppose that barcode-reading device 101-1 is used in room A, barcode-reading device 101-2 is used in room B, and barcode-reading device 101-3 is used in room C. The device statistics 125 could include the average number of barcode scans made per hour for each of the barcode-reading devices 101-1, 101-2, 101-3. Suppose that this metric is about average for barcode-reading devices 101-1, 101-2 but significantly above average for barcode-reading device 101-3. In this case, the data analysis results 134 could include a recommendation to purchase one or more additional barcode-reading devices 101 for room C. This information could be useful to the medical facility itself. This information could also be useful to a manufacturer of barcode-reading devices 101 who wants to sell additional barcode-reading devices 101 to the medical facility.

The device statistics 125 and/or data analysis results 134 can be made available to one or more entities who could benefit from this information. For example, the device statistics 125 and/or data analysis results 134 can be made available to a manufacturer of the barcode-reading devices 101, an enterprise that owns and/or is using the barcode-reading devices 101, etc.

Communication between the plurality of host computing devices 102-1, 102-2, 102-3 and the remote server 103 can occur via one or more computer networks. In some embodiments, the plurality of host computing devices 102-1, 102-2, 102-3 and the remote server 103 can be connected to a dedicated subnet within a larger network. For example, suppose that the host computing devices 102-1, 102-2, 102-3 and the remote server 103 are all connected to an enterprise's computer network. Within that computer network, there could be a subnet that is dedicated to the collection of data from barcode-reading devices 101-1, 101-2, 101-3. The host computing devices 102-1, 102-2, 102-3 and the remote server 103 could each be connected to that subnet.

In some embodiments, communication between the host computing device 102 and the remote server 103 can occur via the Internet. In some embodiments, the remote server 103 can be located in the "cloud." More specifically, the remote server 103 can be part of a cloud computing infrastructure that is maintained and operated by a cloud computing provider for the purpose of providing cloud computing services. Examples of such cloud computing services include Amazon Web Services and Microsoft Azure.

In embodiments where the remote server 103 is part of a cloud computing infrastructure, the remote server 103 can be part of a private cloud or a public cloud. A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet.

In some embodiments, the barcode-reading device 101 can be a standalone device whose primary purpose is scanning barcodes. In other words, instead of being a general-purpose computing device that has been adapted to scanning barcodes, the barcode-reading device 101 can be specifically designed for the primary purpose of scanning barcodes.

In some embodiments, the manufacturer of the barcode-reading devices 101 can also control the remote server 103. For example, the manufacturer of the barcode-reading devices 101 can set up a remote server 103 and implement the techniques disclosed herein in order to determine additional information related to the reliability and/or maintenance of the barcode-reading devices 101.

FIG. 2 illustrates an example of a usage log 222 that can be maintained by a barcode-reading device 101 in accordance with the present disclosure.

The usage log 222 includes a plurality of records 232. Each record 232 can correspond to a different event related to the barcode-reading device 101. As noted above, there are many different kinds of events for which information can be recorded in the usage log 222. In some embodiments, the barcode-reading device 101 can be configured so that it records certain information in the usage log 222 whenever the barcode-reading device 101 scans a barcode. Therefore, at least some of the records 232 in the usage log 222 can correspond to barcode scans. The barcode-reading device 101 can also be configured so that it records information about events that are not specifically associated with a barcode scan. Therefore, at least some of the records 232 in the usage log 222 can correspond to events that are not specifically associated with a barcode scan.

In the depicted example, the usage log 222 includes a timestamp field 233. The timestamp field 233 in a record 232 corresponding to a particular event can indicate when the event occurred. In some embodiments, the information in the timestamp field 233 can be provided by the real-time clock 136.

The usage log 222 also includes an event code field 234. The event code field 234 in a record 232 corresponding to a particular event can indicate the type of event being represented by the record 232. In the present example, it will be assumed that an event code of "1" represents the barcode-reading device 101 being powered on, an event code of "2" represents the barcode-reading device 101 being powered off, an event code of "3" represents a barcode scan made by the barcode-reading device 101, and an event code of "4" represents a failure experienced by the barcode-reading device 101. Of course, these specific event codes are provided for purposes of example only and should not be interpreted as limiting the scope of the present disclosure. Many different kinds of event codes can be defined in accordance with the techniques disclosed herein.

The usage log 222 also includes a success indicator field 235. The success indicator field 235 can be specifically associated with barcode scans. In other words, the success indicator field 235 can be assigned a value when the event being recorded is a barcode scan, and can otherwise be left null. The success indicator field 235 in a record 232 corresponding to a particular barcode scan can indicate whether the barcode scan was successful or unsuccessful. In the present example, it will be assumed that a value of "0" means that the barcode scan was successful and that a value of "1" means that the barcode scan was unsuccessful.

The usage log 222 also includes a decoded data field 238. The decoded data field 238 can be specifically associated with successful barcode scans. In other words, the decoded data field 238 can be assigned a value when the event being recorded is a successful barcode scan, and can otherwise be left null. The decoded data field 238 in a record 232 corresponding to a particular successful barcode scan can include the decoded data that is generated as a result of decoding the barcode.

Of course, the specific usage log 222 shown in FIG. 2 is provided for purposes of example only and should not be interpreted as limiting the scope of the present disclosure. A usage log in accordance with the present disclosure does not have to include all of the fields shown in FIG. 2. In addition, a usage log in accordance with the present disclosure can include additional fields not shown in FIG. 2. For example, in some embodiments a usage log can include a symbology field that indicates the symbology of a decoded barcode.

Under some circumstances, a usage log (such as the usage log 222 shown in FIG. 2) could be used as evidence that a particular event occurred. For example, consider a scenario where a plurality of barcode-reading devices are used in a medical facility and each barcode-reading device maintains a usage log. In this scenario, the barcode-reading devices could be configured so that each time a barcode-reading device is used to scan a barcode, the decoded data that is generated from scanning the barcode is stored in the usage log. Many medical facilities have rules that require medical personnel (e.g., nurses) to scan one or more barcodes before administering medication. For example, before administering medication, a nurse may be required to scan (i) a barcode located on the nurse's identification badge, (ii) a barcode located on a wristband attached to the patient, and (iii) a barcode located on a container that includes the medication that is going to be administered. The decoded data from each of these barcode scans can be stored in the usage log, with corresponding timestamps.

For example, the records 232-1, 232-2, 232-3, 232-4 in the usage log 222 shown in FIG. 2 could represent an example of a nurse administering medication to a patient. In this example, record 232-1 could represent the scan of a barcode located on the nurse's identification badge. The decoded data in record 232-1 ("1139") could correspond to an identifier that uniquely identifies the nurse that administered the medication. This identifier could be included in a barcode on the nurse's identification badge. Record 232-2 could represent the scan of a barcode located on a wristband attached to the patient. The decoded data in record 232-2 ("3290") could correspond to an identifier that uniquely identifies the patient that is receiving the medication. This identifier could be included in a barcode on a wristband that is attached to the patient's wrist. Record 232-3 could represent the unsuccessful scan of a barcode, such as a barcode located on a container that includes the medication that is going to be administered. Record 232-4 could represent the subsequent successful scan of the barcode located on the container. The decoded data in record 232-4 ("2176") could correspond to an identifier that uniquely identifies the medication that is going to be administered. This identifier could be included in a barcode on the container that includes the medication that is going to be administered.

Thus, the records 232-1, 232-2, 232-3, 232-4 in the usage log 222 can include information identifying who administered the medication, what medication was administered, who received the medication, and at what time. This information could be useful for a variety of reasons, including as evidence in a medical malpractice lawsuit demonstrating what medication was actually administered to whom, by whom, and when. In a similar manner, the records 232-5, 232-6, 232-7 in the usage log 222 could also represent an example of a nurse administering medication to a patient.

As discussed above, in some embodiments the device statistics 125 that are generated based on the usage log 122 can include the amount of time between usage bursts. For purposes of example, the usage log 222 shown in FIG. 2 includes two usage bursts. In some embodiments, the term "usage burst" can refer to a plurality of barcode scans for which the amount of time between successive barcode scans is less than a pre-defined amount. For purposes of describing the depicted example, it will be assumed that this pre-defined amount of time is 30 seconds. (Of course, this specific value is provided for purposes of example only; other values may be used instead.) Thus, the barcode scans corresponding to records 232-1, 232-2, 232-3, 232-4 constitute a usage burst because the barcode scan corresponding to record 232-2 occurs within 30 seconds of the barcode scan corresponding to record 232-1, the barcode scan corresponding to record 232-3 occurs within 30 seconds of the barcode scan corresponding to record 232-2, and the barcode scan corresponding to record 232-4 occurs within 30 seconds of the barcode scan corresponding to record 232-3. Similarly, the barcode scans corresponding to records 232-5, 232-6, 232-7 constitute a usage burst because the barcode scan corresponding to record 232-6 occurs within 30 seconds of the barcode scan corresponding to record 232-5, and the barcode scan corresponding to record 232-7 occurs within 30 seconds of the barcode scan corresponding to record 232-6.

There are a variety of scenarios where a usage burst could occur. One possible scenario was described above, where several barcodes (e.g., a barcode located on a nurse's identification badge, a barcode located on a patient's wristband, a barcode located on a medicine container) are scanned in rapid succession in the context of administering medicine to a patient. Many other scenarios where usage bursts can occur will be readily apparent to those skilled in the art.

Figure 3:
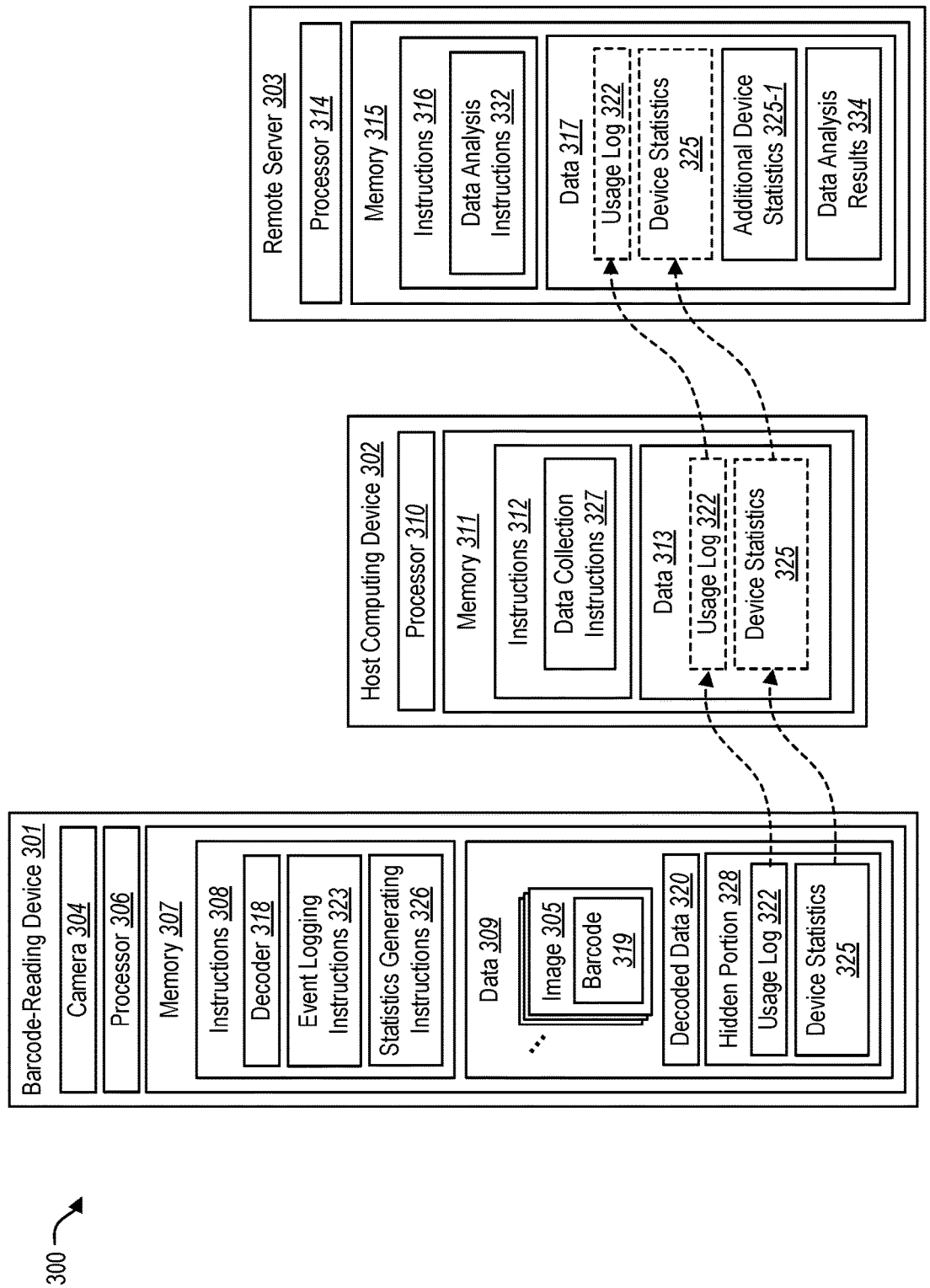
FIG. 3 illustrates another example of a barcode-reading system in which the techniques disclosed herein can be utilized.

FIG. 3 illustrates another example of a barcode-reading system 300 in which the techniques disclosed herein can be utilized. The barcode-reading system 300 is similar to the barcode-reading system 100 shown in FIGS. 1A and 1B, except as indicated below.

In the embodiment shown in FIGS. 1A and 1B, the host computing device 102 retrieves the usage log 122 from the barcode-reading device 101 and sends the usage log 122 to the remote server 103. The remote server 103 then generates device statistics 125 based at least in part on the usage log 122. In contrast, in the embodiment shown in FIG. 3, the barcode-reading device 301 itself generates device statistics 325.

In the barcode-reading system 300 shown in FIG. 3, the instructions 308 in the memory 307 of the barcode-reading device 301 can include statistics generating instructions 326. The statistics generating instructions 326 can be executable by the processor 306 of the barcode-reading device 301 to determine the device statistics 325 based at least in part on the information contained in the usage log 322.

As in the embodiment shown in FIGS. 1A and 1B, the usage log 322 can be stored among the data 309 on the barcode-reading device 301 within a hidden portion 328 of the memory 307. The device statistics 325 can also be stored within the hidden portion 328 of the memory 307.

The host computing device 302 can be configured to cause the device statistics 325 to be sent to the remote server 303. More specifically, the instructions 312 in the memory 311 of the host computing device 302 can include data collection instructions 327. The data collection instructions 327 can be executable by the processor 310 of the host computing device 302 to retrieve the device statistics 325 from the barcode-reading device 301 and send the device statistics 325 to the remote server 303.

FIG. 3 shows the usage log 322 and the device statistics 325 stored among the data 313 in the memory 311 of the host computing device 302 as they are being sent to the remote server 303. FIG. 3 also shows the usage log 322 and the device statistics 325 stored among the data 317 in the memory 315 of the remote server 303.

As before, the remote server 303 can be configured to analyze the device statistics 325 and determine information about the barcode-reading device 301. More specifically, the instructions 316 in the memory 315 of the remote server 303 can include data analysis instructions 332. The data analysis instructions 332 can be executable by the processor 314 of the remote server 303 to analyze the device statistics 325 and generate data analysis results 334. The data analysis results 334 can be stored among the data 317 in the memory 315 of the remote server 303.

In some embodiments, the host computing device 302 can be configured to cause both the usage log 322 and the device statistics 325 to be sent to the remote server 303. In such embodiments, the remote server 303 can determine additional device statistics 325-1 based at least in part on the information contained in the usage log 322. The remote server 303 can determine data analysis results 334 based at least in part on the device statistics 325 received from the barcode-reading device 301 and also based at least in part on the additional device statistics 325-1 that the remote server 303 calculates.

In the embodiment shown in FIGS. 1A and 1B, the host computing device 102 can be configured to erase the contents of the usage log 122 under some circumstances (e.g., after the usage log 122 has been retrieved from the barcode-reading device 101 and sent to the remote server 103 for processing). In the embodiment shown in FIG. 3, the host computing device 302 can be configured to erase the usage log 322 and/or the device statistics 325 from the barcode-reading device 301 under some circumstances.

For example, the data collection instructions 327 can be executable by the processor 310 of the host computing device 302 to erase the usage log 322 and/or the device statistics 325 from the barcode-reading device 301 after the usage log 322 and/or the device statistics 325 have been sent to the remote server 303. As discussed above, in embodiments where the usage log 322 and/or the device statistics 325 include sensitive information, erasing the usage log 322 and/or the device statistics 325 from the barcode-reading device 301 has the effect of reducing the potential for exposure of sensitive information.

In some embodiments, the remote server 303 can receive a usage log 322 and/or device statistics 325 from a plurality of barcode-reading devices 301. The data analysis results 334 can be generated based at least in part on the usage logs 322 and/or the device statistics 325 received from the plurality of barcode-reading devices 301.

The other components shown in FIG. 3 and not specifically discussed above (i.e., the camera 304, the decoder 318, the event logging instructions 323, the images 305 including barcodes 319, and the decoded data 320) can be similar to the corresponding components that were described above in connection with the barcode-reading system 100 shown in FIGS. 1A and 1B.

Figure 4:
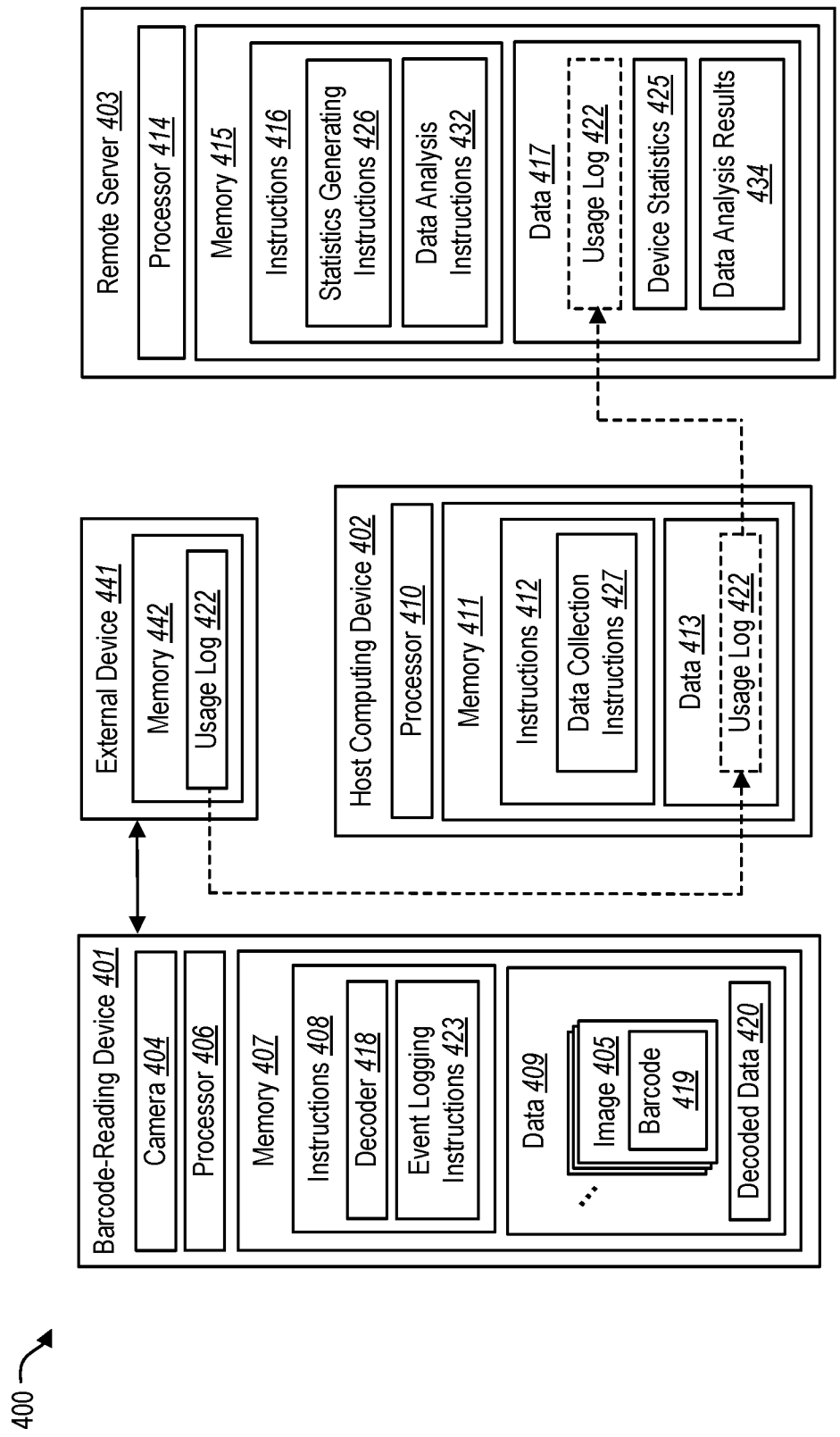
FIG. 4 illustrates another example of a barcode-reading system in which the techniques disclosed herein can be utilized.

FIG. 4 illustrates another example of a barcode-reading system 400 in which the techniques disclosed herein can be utilized. The barcode-reading system 400 is similar to the barcode-reading system 100 shown in FIGS. 1A and 1B, except as indicated below.

In the embodiment shown in FIGS. 1A and 1B, the usage log 122 is stored on the barcode-reading device 101 itself. In contrast, in the embodiment shown in FIG. 4, the usage log 422 is not stored among the data 409 in the memory 407 of the barcode-reading device 401. Instead, the usage log 422 is stored on an external device 441 that is communicatively coupled to the barcode-reading device 401. More specifically, the usage log 422 is stored in memory 442 that is included within the external device 441. In some embodiments, the external device 441 can be a dedicated memory device (e.g., a flash memory drive).

The barcode-reading device 401 can be configured to record certain information about events related to the barcode-reading device 401 on the external device 441. More specifically, the instructions 408 in the memory 407 of the barcode-reading device 401 can include event logging instructions 423. The event logging instructions 423 can be executable by the processor 406 of the barcode-reading device 401 to record information in the usage log 422, which is stored in the memory 442 of the external device 441.

The host computing device 402 can be configured to provide the usage log 422 to the remote server 403. More specifically, the instructions 412 in the memory 411 of the host computing device 402 can include data collection instructions 427. The data collection instructions 427 can be executable by the processor 410 of the host computing device 402 to retrieve the usage log 422 from the external device 441 and send the usage log 422 to the remote server 403. FIG. 4 shows the usage log 422 stored among the data 413 in the memory 411 of the host computing device 402 as the usage log 422 is being sent to the remote server 403. FIG. 4 also shows the usage log 422 stored among the data 417 in the memory 415 of the remote server 403.

The remote server 403 can generate device statistics 425 based at least in part on the information contained in the usage log 422. The instructions 416 in the memory 415 of the remote server 403 include statistics generating instructions 426, which are executable by the processor 414 of the remote server 403 to generate the device statistics 425. The remote server 403 can also analyze the device statistics 425 and generate data analysis results 434. The instructions 416 in the memory 415 of the remote server 403 include data analysis instructions 432, which are executable by the processor 414 of the remote server 403 to generate the data analysis results 434.

In an alternative embodiment, the barcode-reading device 401 itself can be configured to generate the device statistics 425 and store the device statistics 425 on the external device 441. In this case, the host computing device 402 can be configured to retrieve the device statistics 425 from the external device 441 and send the device statistics 425 to the remote server 403. In another alternative embodiment, the host computing device 402 can be configured to retrieve both the usage log 422 and the device statistics 425 from the external device 441 and send both the usage log 422 and the device statistics 425 to the remote server 403.

The other components shown in FIG. 4 and not specifically discussed above (i.e., the camera 404, the decoder 418, the images 405 including barcodes 419, and the decoded data 420) can be similar to the corresponding components that were described above in connection with the barcode-reading system 100 shown in FIGS. 1A and 1B.

Figure 5:
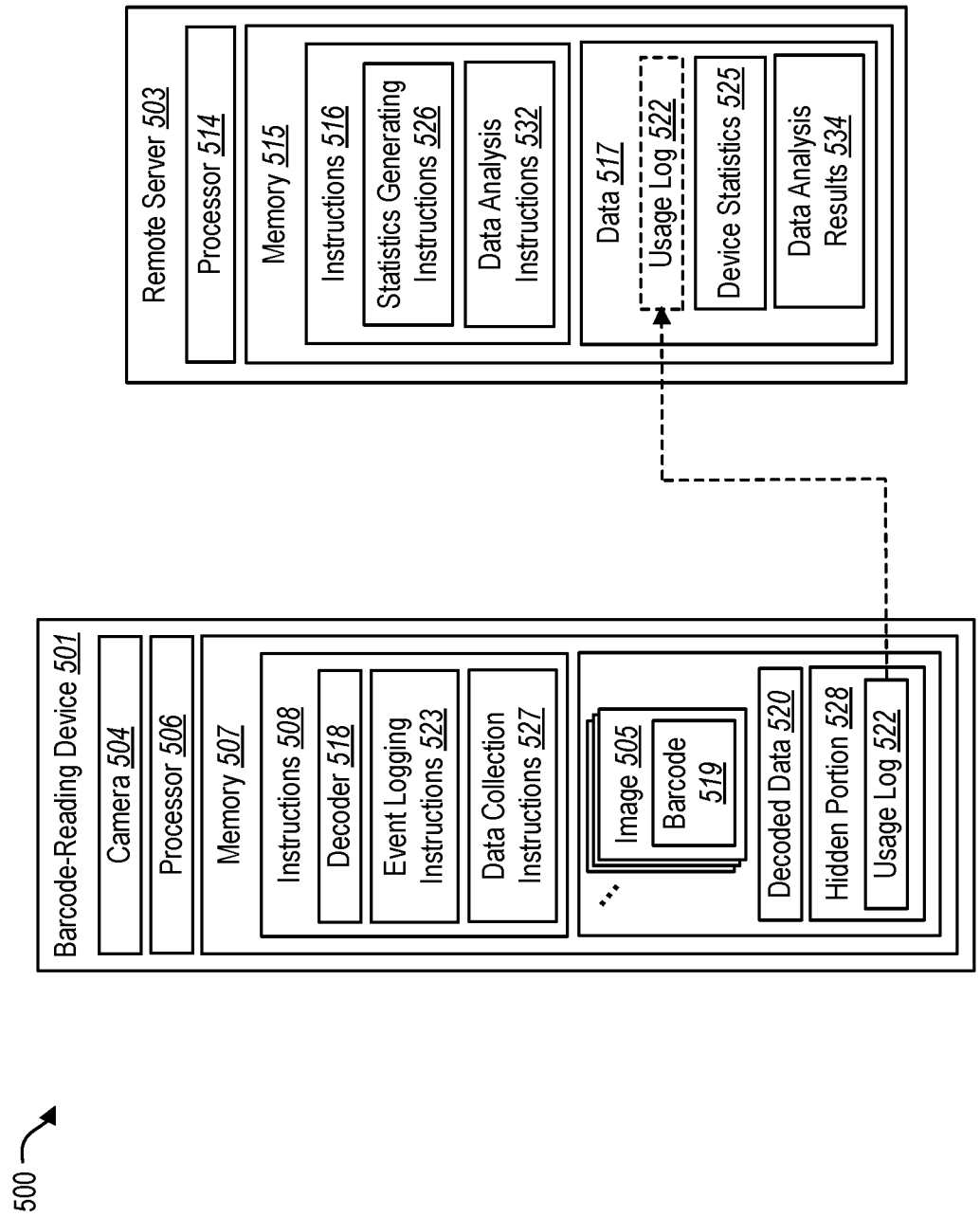
FIG. 5 illustrates another example of a barcode-reading system in which the techniques disclosed herein can be utilized.

FIG. 5 illustrates another example of a barcode-reading system 500 in which the techniques disclosed herein can be utilized. The barcode-reading system 500 is similar to the barcode-reading system 100 shown in FIGS. 1A and 1B, except as indicated below.

In the embodiment shown in FIGS. 1A and 1B, the host computing device 102 retrieves the usage log 122 from the barcode-reading device 101 and provides the usage log 122 to the remote server 103. In contrast, in the embodiment shown in FIG. 5, the barcode-reading device 501 itself provides the usage log 522 to the remote server 503. More specifically, the instructions 508 in the memory 507 of the barcode-reading device 501 can include data collection instructions 527 that are executable by the processor 506 of the barcode-reading device 501 to send the usage log 522 to the remote server 503.

In some embodiments, the barcode-reading device 501 can be a mobile computing device instead of a standalone barcode scanner. In other words, the barcode-reading device 501 can be a general-purpose computing device that includes a camera 504 and that has decoding software (in the form of the decoder 518) installed on it, which gives the general-purpose computing device the capability to read barcodes.

In some embodiments, the system 500 can be configured so that the barcode-reading device 501 is authenticated before it is permitted to connect to the remote server 503. This can be advantageous for any type of barcode-reading device 501, but it can be especially important in a scenario where the barcode-reading device 501 is not manufactured by the same entity that controls the remote server 503 (e.g., where the barcode-reading device 501 is a mobile computing device instead of a standalone barcode scanner). In some embodiments, authentication can be performed using Secure Shell Protocol (SSH) public key authentication.

The remote server 503 can be configured similarly to the remote server 103 in the embodiment shown in FIGS. 1A and 1B. The instructions 516 in the memory 515 of the remote server 503 can include statistics generating instructions 526 and data analysis instructions 532. The statistics generating instructions 526 can be executable by the processor 514 of the remote server 503 to determine device statistics 525 based at least in part on the information contained in the usage log 522. The data analysis instructions 532 can be executable by the processor 514 of the remote server 503 to analyze the device statistics 525 and generate data analysis results 534. The device statistics 525 and data analysis results 534 can be stored among the data 517 on the remote server 503.

In some embodiments, communication between the barcode-reading device 501 and the remote server 503 can occur via one or more computer networks, such as any of the computer networks mentioned previously. In some embodiments, communication between the barcode-reading device 501 and the remote server 503 can occur via the Internet.

The other components shown in FIG. 5 and not specifically discussed above (i.e., the camera 504, the decoder 518, the event logging instructions 523, the images 505 including barcodes 519, the decoded data 520, and the hidden portion 528 of the memory 507) can be similar to the corresponding components that were described above in connection with the barcode-reading system 100 shown in FIGS. 1A and 1B.

Figure 6:
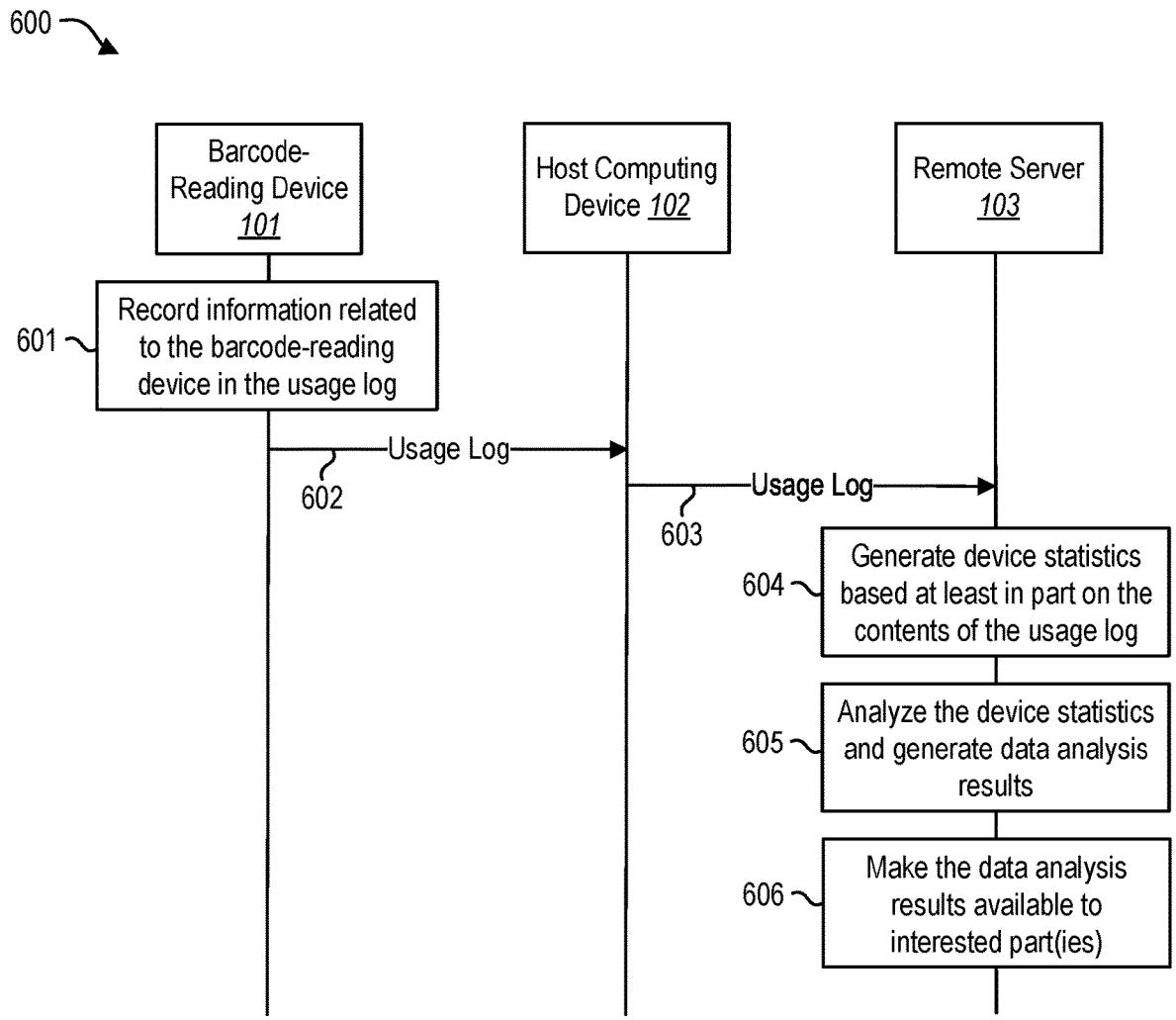
FIG. 6 illustrates an example of a method that can be implemented in the barcode-reading system shown in FIGS. 1A and 1B.

FIG. 6 illustrates an example of a method 600 that can be implemented in the barcode-reading system 100 shown in FIGS. 1A and 1B. At 601, the barcode-reading device 101 records information related to the barcode-reading device 101 in the usage log 122. At 602, the host computing device 102 can retrieve the usage log 122 from the barcode-reading device 101. At 603, the host computing device 102 can send the usage log 122 to the remote server 103. At 604, the remote server 103 can generate device statistics 125 based at least in part on the contents of the usage log 122. At 605, the remote server 103 can analyze the device statistics 125 and generate data analysis results 134. At 606, the remote server 103 can make the data analysis results 134 available to interested part(ies), such as a manufacturer of the barcode-reading device 101 and/or an enterprise that uses the barcode-reading device 101.

Figure 7:
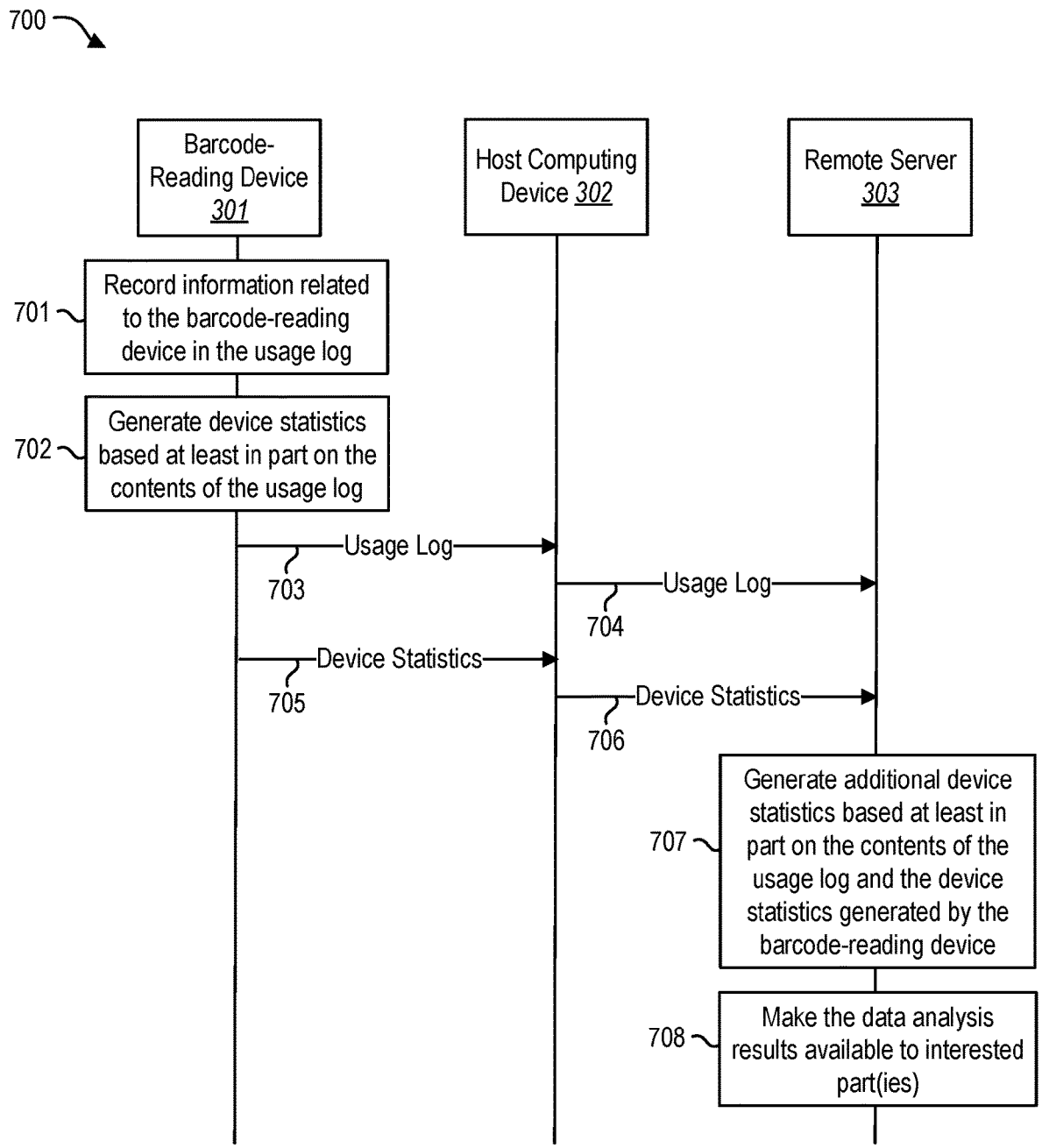
FIG. 7 illustrates an example of a method that can be implemented in the barcode-reading system shown in FIG. 3.

FIG. 7 illustrates an example of a method 700 that can be implemented in the barcode-reading system 300 shown in FIG. 3. At 701, the barcode-reading device 301 records information related to the barcode-reading device 301 in the usage log 322. At 702, the barcode-reading device 301 generates device statistics 325 based at least in part on the contents of the usage log 322. At 703, the host computing device 302 can retrieve the usage log 322 from the barcode-reading device 301. At 704, the host computing device 302 can send the usage log 322 to the remote server 303. At 705, the host computing device 302 can retrieve the device statistics 325 from the barcode-reading device 301. At 706, the host computing device 302 can send the device statistics 325 to the remote server 303. At 707, the remote server 303 can generate additional device statistics 325-1 based at least in part on the contents of the usage log 322 and the device statistics 325 generated by the barcode-reading device 301. At 708, the remote server 303 can make the data analysis results 334 available to interested part(ies), such as a manufacturer of the barcode-reading device 301 and/or an enterprise that uses the barcode-reading device 301.

Figure 8:
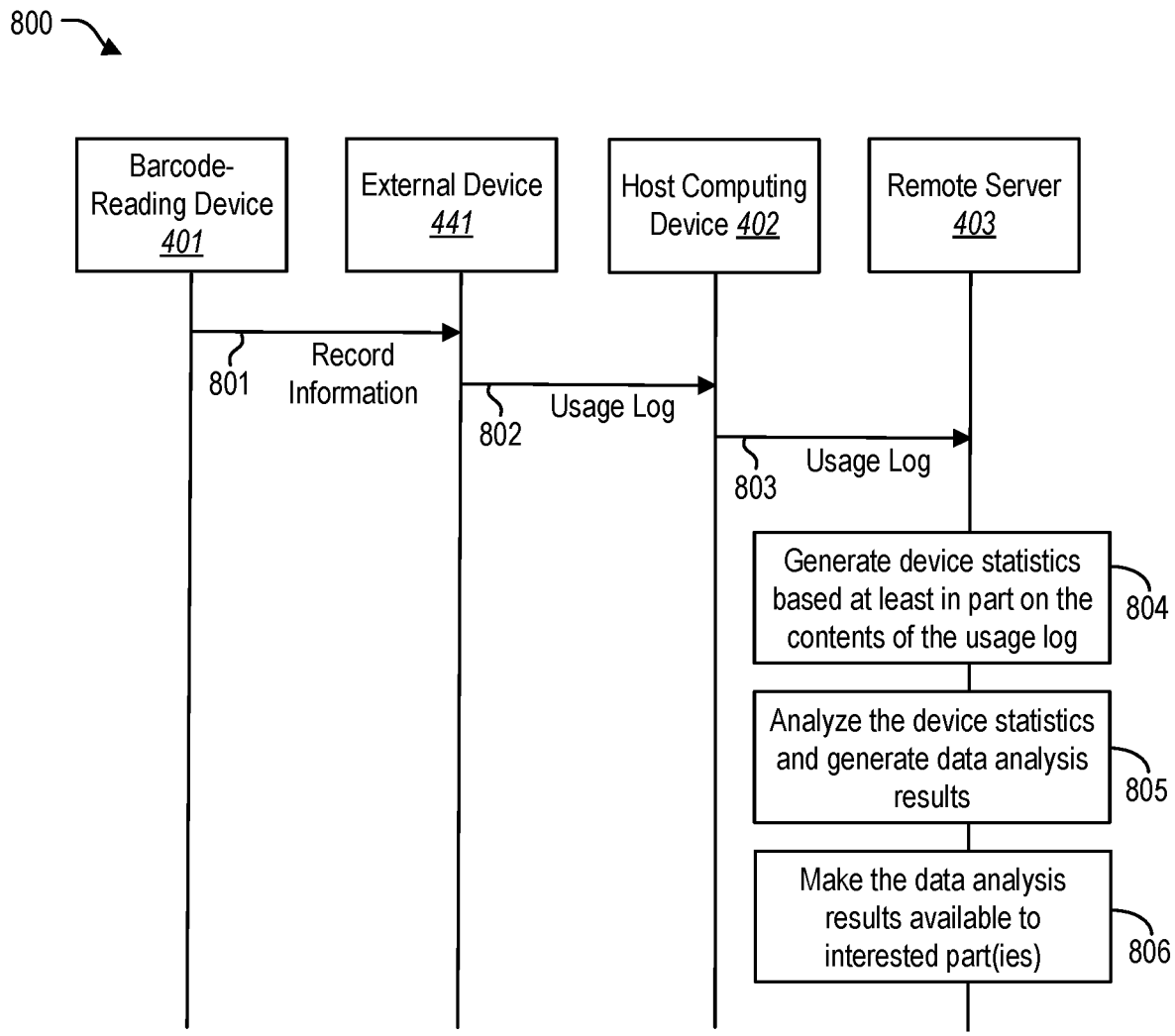
FIG. 8 illustrates an example of a method that can be implemented in the barcode-reading system shown in FIG. 4.

FIG. 8 illustrates an example of a method 800 that can be implemented in the barcode-reading system 400 shown in FIG. 4. At 801, the barcode-reading device 401 records information related to the barcode-reading device 401 in the usage log 422, which is stored on the external device 441. At 802, the host computing device 402 can retrieve the usage log 422 from the barcode-reading device 401. At 803, the host computing device 402 can send the usage log 422 to the remote server 403. At 804, the remote server 403 can generate device statistics 425 based at least in part on the contents of the usage log 422. At 805, the remote server 403 can analyze the device statistics 425 and generate data analysis results 434. At 806, the remote server 403 can make the data analysis results 434 available to interested part(ies), such as a manufacturer of the barcode-reading device 401 and/or an enterprise that uses the barcode-reading device 401.

Figure 9:
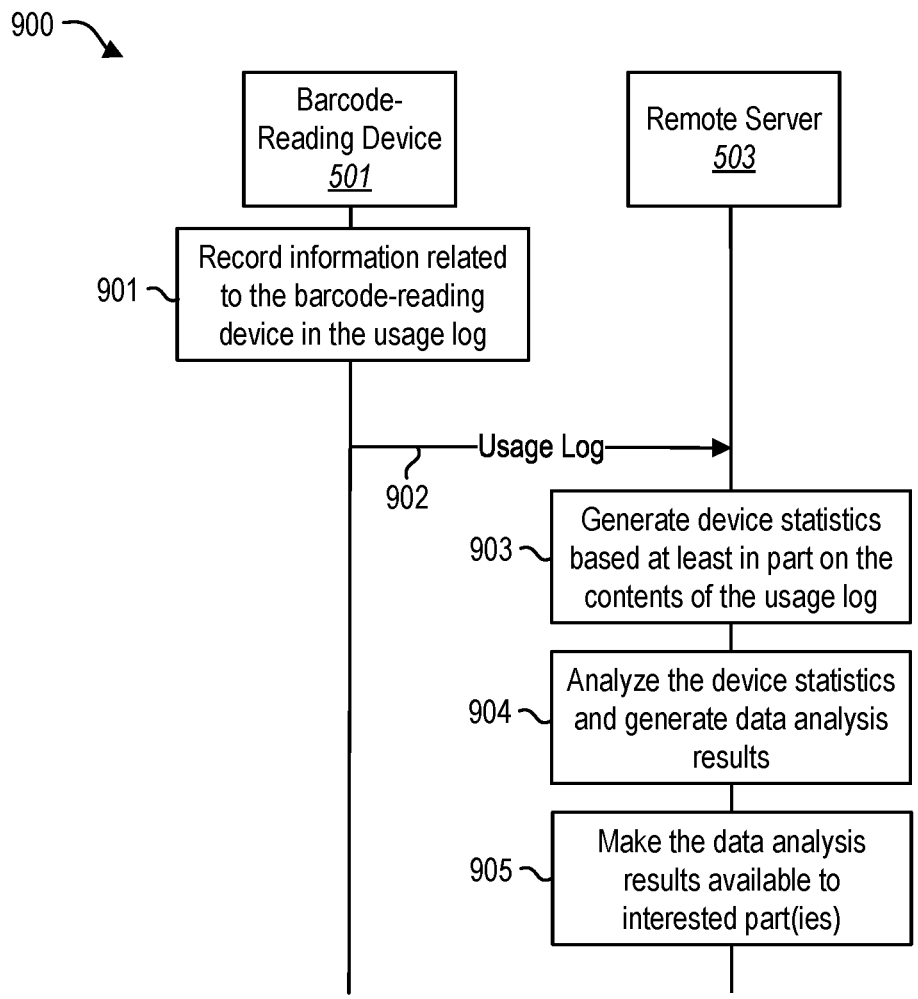
FIG. 9 illustrates an example of a method that can be implemented in the barcode-reading system shown in FIG. 5.

FIG. 9 illustrates an example of a method 900 that can be implemented in the barcode-reading system 500 shown in FIG. 5. At 901, the barcode-reading device 501 records information related to the barcode-reading device 501 in the usage log 522. At 902, the barcode-reading device 501 can send the usage log 522 to the remote server 503. At 903, the remote server 503 can generate device statistics 525 based at least in part on the contents of the usage log 522. At 904, the remote server 503 can analyze the device statistics 525 and generate data analysis results 534. At 905, the remote server 503 can make the data analysis results 534 available to interested part(ies), such as a manufacturer of the barcode-reading device 501 and/or an enterprise that uses the barcode-reading device 501.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "computing device" can refer generally to any electronic equipment that includes memory and a processor that is configured to follow instructions stored in the memory to perform sequences of mathematical and logical operations. Some examples of computing devices that can be used in connection with the disclosed embodiments include laptop computers, mobile devices (e.g., smartphones), tablet computers, desktop computers, smartwatches, virtual reality headsets, fitness trackers, and the like.

The term "server" can refer to computer hardware or software. When the term "server" refers to computer hardware, it can refer to any computing device that provides functionality for other programs or devices.

The term "enterprise" can refer to an organization, venture, association, group, institution, or undertaking that exists for one or more particular purposes. Some examples of enterprises include corporations, small businesses, non-profit institutions, medical institutions or facilities (e.g., hospitals), government bodies, etc.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading system, comprising:
   a barcode-reading device comprising a barcode-reading device processor and a camera that is configured to capture images;
   memory that is communicatively coupled to the barcode-reading device processor, the memory comprising:
      a decoder that is executable by the barcode-reading device processor to decode barcodes in the images and generate decoded data;
      a usage log; and
      event logging instructions that are executable by the barcode-reading device processor to record information related to the barcode-reading device in the usage log, the event logging instructions being executable by the barcode-reading device processor to (i) record certain information in the usage log whenever the barcode-reading device scans a barcode, and (ii) record certain other information about events that are not associated with a barcode scan in the usage log; and
   a host computing device that is communicatively coupled to the memory, the host computing device comprising:
      a host processor; and
      host memory that is communicatively coupled to the host processor, the host memory comprising data collection instructions that are executable by the host processor to:
         retrieve at least one of the usage log or device statistics generated based at least in part on the usage log from the barcode-reading device; and
         send at least one of the usage log or the device statistics to a remote server.

2. The barcode-reading system of claim 1, wherein the event logging instructions are executable by the barcode-reading device processor to record information in the usage log whenever the barcode-reading device scans a barcode.

3. The barcode-reading system of claim 2, wherein the information that is recorded in the usage log whenever the barcode-reading device scans a barcode comprises a timestamp and an indication of whether the barcode is successfully decoded.

4. The barcode-reading system of claim 3, wherein the information that is recorded in the usage log whenever the barcode-reading device scans a barcode additionally comprises at least one of:
   a symbology of the barcode;
   the decoded data that is obtained if the barcode is successfully decoded; or
   a copy of an image that is captured and processed by the barcode-reading device in connection with scanning the barcode.

5. The barcode-reading system of claim 1, wherein the information about events that are not associated with a barcode scan comprises information about at least one of:
   when the barcode-reading device is powered on;
   when the barcode-reading device is powered off; or
   when configuration settings of the barcode-reading device are changed.

6. The barcode-reading system of claim 1, wherein the data collection instructions are executable by the host processor to:
   periodically retrieve at least one of the usage log or the device statistics from the barcode-reading device; and
   periodically send at least one of the usage log or the device statistics to the remote server.

7. The barcode-reading system of claim 1, wherein:
   the memory further comprises statistics generating instructions that are executable by the barcode-reading device processor to generate device statistics based at least in part on the usage log; and
   the data collection instructions are executable by the host processor to retrieve the device statistics from the barcode-reading device and send the device statistics to the remote server.

8. The barcode-reading system of claim 1, wherein:
   the memory comprises non-volatile memory;
   the non-volatile memory comprises a file system; and
   the usage log comprises a file within the file system of the non-volatile memory.

9. The barcode-reading system of claim 1, wherein:
   the memory further comprises configuration settings for the barcode-reading device; and
   the configuration settings comprise event logging settings that specify what information is recorded in the usage log and how often the information is recorded in the usage log.

10. The barcode-reading system of claim 1, wherein the device statistics comprise at least one of:
    the number of barcode scans made during a particular time period;
    the average number of barcode scans made per time period over a longer time interval;
    the number of unsuccessful barcode scans made during a particular time period;
    the average number of unsuccessful barcode scans made per time period over a longer time interval;
    the number of successful barcode scans made during a particular time period;
    the average number of successful barcode scans made per time period over a longer time interval;
    the total number of barcode scans made since the barcode-reading device was powered on;
    the number of unsuccessful barcode scans made since the barcode-reading device was powered on; or
    the number of successful barcode scans made since the barcode-reading device was powered on.

11. The barcode-reading system of claim 1, wherein the usage log comprises:
    a timestamp field, wherein the timestamp field in a record corresponding to a particular event indicates when the event occurred;
    an event code field, wherein the event code field in a record indicates a type of event being represented by the record;

a success indicator field, wherein the success indicator field in a record corresponding to a particular barcode scan indicates whether the barcode scan was successful or unsuccessful; and a decoded data field, wherein the decoded data field in a record corresponding to a successful barcode scan includes the decoded data that is generated as a result of decoding the barcode.

12. A barcode-reading system, comprising:

a barcode-reading device comprising a barcode-reading device processor and a camera that is configured to capture images;

memory that is communicatively coupled to the barcode-reading device processor, the memory comprising (i) a decoder that is executable by the barcode-reading device processor to decode barcodes in the images and generate decoded data, (ii) a usage log, and (iii) event logging instructions that are executable by the barcode-reading device processor to record information related to the barcode-reading device in the usage log;

a host computing device that is communicatively coupled to the memory, the host computing device comprising a host processor and host memory that is communicatively coupled to the host processor, the host memory comprising data collection instructions that are executable by the host processor to retrieve the usage log from the barcode-reading device and send the usage log to a remote server; and the remote server comprising a remote server processor and remote server memory that is communicatively coupled to the remote server processor, the remote server memory comprising statistics generating instructions that are executable by the remote server processor to receive the usage log from the barcode-reading device via the host computing device and generate device statistics based at least in part on the usage log.

13. The barcode-reading system of claim 12, wherein the data collection instructions are additionally executable by the host processor to erase the usage log from the barcode-reading device after the usage log has been sent to the remote server.

14. A barcode-reading system, comprising:

a barcode-reading device comprising a barcode-reading device processor and a camera that is configured to capture images;

memory that is communicatively coupled to the barcode-reading device processor, the memory comprising: (i) a decoder that is executable by the barcode-reading device processor to decode barcodes in the images and generate decoded data, (ii) a hidden portion, wherein data stored within the hidden portion cannot be accessed by a user interface of the barcode-reading device, (iii) a usage log stored in the hidden portion of the memory, and (iv) event logging instructions that are executable by the barcode-reading device processor to record information related to the barcode-reading device in the usage log; and a host computing device that is communicatively coupled to the memory, the host computing device comprising a host processor and host memory that is communicatively coupled to the host processor, the host memory comprising data collection instructions that are executable by the host processor to (a) retrieve at least one of the usage log or device statistics generated based at least in part on the usage log from the barcode-reading device, and (b) send at least one of the usage log or the device statistics to a remote server.

15. A barcode-reading system, comprising:

a barcode-reading device comprising a barcode-reading device processor and a camera that is configured to capture images;

memory that is communicatively coupled to the barcode-reading device processor, the memory comprising: (i) a decoder that is executable by the barcode-reading device processor to decode barcodes in the images and generate decoded data, (ii) a usage log, (iii) event logging instructions that are executable by the barcode-reading device processor to record information related to the barcode-reading device in the usage log, and (iv) statistics generating instructions that are executable by the barcode-reading device processor to generate device statistics based at least in part on the usage log; and a host computing device that is communicatively coupled to the memory, the host computing device comprising a host processor and host memory that is communicatively coupled to the host processor, the host memory comprising data collection instructions that are executable by the host processor to (a) retrieve the device statistics from the barcode-reading device, (b) send the device statistics to a remote server, and (c) erase the device statistics from the barcode-reading device after the device statistics have been sent to the remote server.

16. The barcode-reading system of claim 15, wherein the barcode-reading device comprises the memory that stores the usage log and the device statistics.

17. The barcode-reading system of claim 15, wherein the memory that stores the usage log and the device statistics is external to the barcode-reading device.

18. A barcode-reading system, comprising:

a plurality of barcode-reading devices, each barcode-reading device comprising a barcode-reading device processor, a camera that is configured to capture images, and memory that is communicatively coupled to the barcode-reading device processor, the memory comprising: (i) a decoder that is executable by the barcode-reading device processor to decode barcodes in the images and generate decoded data, (ii) a usage log, wherein the plurality of barcode-reading devices collectively comprise a plurality of usage logs, and (iii) event logging instructions that are executable by the barcode-reading device processor to record information related to the barcode-reading device in the usage log;

at least one host computing device, each host computing device being communicatively coupled to a barcode-reading device, each host computing device comprising a host processor and host memory that is communicatively coupled to the host processor, the host memory comprising data collection instructions that are executable by the host processor to (a) retrieve at least one of the usage log or device statistics generated based at least in part on the usage log from the barcode-reading device, and (b) send at least one of the usage log or the device statistics to a remote server; and the remote server comprising a remote server processor and remote server memory that is communicatively coupled to the remote server processor, the remote server memory comprising data analysis instructions that are executable by the remote server processor to obtain device statistics about the plurality of barcode-reading devices and generate data analysis results, the device statistics about the plurality of barcode-reading devices being generated from the plurality of usage logs.

19. A barcode-reading system, comprising:

a barcode-reading device comprising a barcode-reading device processor and a camera that is configured to capture images;

memory that is communicatively coupled to the barcode-reading device processor, the memory comprising: (i) a decoder that is executable by the barcode-reading device processor to decode barcodes in the images and generate decoded data, (ii) a usage log, and (iii) event logging instructions that are executable by the barcode-reading device processor to record information related to the barcode-reading device in the usage log; and a host computing device that is communicatively coupled to the memory, the host computing device comprising a host processor and host memory that is communicatively coupled to the host processor, the host memory comprising data collection instructions that are executable by the host processor to retrieve at least one of the usage log or device statistics generated based at least in part on the usage log from the barcode-reading device and send at least one of the usage log or the device statistics to a remote server;

wherein the device statistics comprise at least one of (a) the number of barcode scans made during a particular time period, (b) the average number of barcode scans made per time period over a longer time interval, (c) the number of unsuccessful barcode scans made during a particular time period, (d) the average number of unsuccessful barcode scans made per time period over a longer time interval, (e) the number of successful barcode scans made during a particular time period, (f) the average number of successful barcode scans made per time period over a longer time interval, (g) the total number of barcode scans made since the barcode-reading device was powered on, (h) the number of unsuccessful barcode scans made since the barcode-reading device was powered on, or (i) the number of successful barcode scans made since the barcode-reading device was powered on.

* * * * *